United States Patent
Wu et al.

(10) Patent No.: US 10,370,524 B2
(45) Date of Patent: Aug. 6, 2019

(54) ETHYLENE/ALPHA-OLEFIN/NONCONJUGATED POLYENE BASED COMPOSITIONS FOR THERMOPLASTIC VULCANIZATES

(71) Applicant: Dow Global Technologies LLC, Midland, MI (US)

(72) Inventors: Xiaosong Wu, Sugarland, TX (US); Colin Li Pi Shan, Pearland, TX (US)

(73) Assignee: Dow Global Technologies LLC, Midland, MI (US)

( * ) Notice: Subject to any disclaimer, the term of this patent is extended or adjusted under 35 U.S.C. 154(b) by 311 days.

(21) Appl. No.: 14/411,453

(22) PCT Filed: Mar. 15, 2013

(86) PCT No.: PCT/US2013/032487
§ 371 (c)(1),
(2) Date: Dec. 26, 2014

(87) PCT Pub. No.: WO2014/003857
PCT Pub. Date: Jan. 3, 2014

(65) Prior Publication Data
US 2015/0210838 A1     Jul. 30, 2015

Related U.S. Application Data

(60) Provisional application No. 61/665,982, filed on Jun. 29, 2012.

(51) Int. Cl.
| | |
|---|---|
| *C08L 23/36* | (2006.01) |
| *C08L 9/00* | (2006.01) |
| *C08L 23/16* | (2006.01) |
| *C08L 23/12* | (2006.01) |
| *C08L 91/00* | (2006.01) |

(52) U.S. Cl.
CPC .............. *C08L 9/00* (2013.01); *C08L 23/12* (2013.01); *C08L 23/16* (2013.01); *C08L 91/00* (2013.01); *C08L 2201/02* (2013.01); *C08L 2205/02* (2013.01); *C08L 2205/025* (2013.01); *C08L 2205/03* (2013.01); *C08L 2205/035* (2013.01); *C08L 2207/04* (2013.01); *C08L 2312/04* (2013.01); *C08L 2314/06* (2013.01); *Y10T 428/139* (2015.01)

(58) Field of Classification Search
CPC ................ C08L 23/16; C08F 297/06
USPC .................. 428/34.7, 35.1; 525/237
See application file for complete search history.

(56) References Cited

U.S. PATENT DOCUMENTS

| | | | |
|---|---|---|---|
| 4,130,535 | A | 12/1978 | Coran et al. |
| 4,311,628 | A | 1/1982 | Abdou-Sabet et al. |
| 4,593,062 | A | 6/1986 | Puydak et al. |
| 6,121,383 | A | 9/2000 | Abdou-Sabet et al. |
| 7,579,408 | B2 | 8/2009 | Walton et al. |
| 7,655,727 | B2 | 2/2010 | Ellul et al. |
| 2007/0129493 | A1 | 6/2007 | Sahnoune et al. |
| 2008/0033089 | A1 | 2/2008 | Ellul et al. |
| 2015/0259491 | A1 | 9/2015 | LiPiShan et al. |
| 2015/0274867 | A1 | 10/2015 | LiPiShan et al. |

FOREIGN PATENT DOCUMENTS

| | | |
|---|---|---|
| EP | 0751182 | 1/1997 |
| WO | 2007/067245 A1 | 6/2007 |
| WO | 2008/016429 A2 | 2/2008 |
| WO | 2009/123609 A1 | 10/2009 |
| WO | 2011/062809 A1 | 5/2011 |
| WO | 2012027448 A1 | 3/2012 |
| WO | WO2012092491 * | 7/2012 |

OTHER PUBLICATIONS

PCT/US2013/032487, International Search Report dated Jan. 3, 2014.
PCT/US2013/032487, International Preliminary Report on Patentability dated Dec. 31, 2014.
PCT/US2013/032487, Written Opinion of the International Searching Authority dated Dec. 29, 2014.

* cited by examiner

*Primary Examiner* — Ellen S Wood
(74) *Attorney, Agent, or Firm* — Husch Blackwell LLP

(57) ABSTRACT

The invention provides a composition comprising at least the following components: A) an ethylene/α-olefin/nonconjugated polyene interpolymer that has the following properties: i) a rheology ratio (V0.1/V100 at 190° C.) greater than, or equal to, 35; ii) a weight average molecular weight (Mw) greater than, or equal to, 200,000 g/mol; and iii) a CCDB (Chemical Composition Distribution Breadth) less than 7; B) a thermoplastic polymer; C) a vulcanization agent; and wherein the interpolymer comprises incorporated oil. The invention also provides a composition comprising the following: A) a first composition comprising: a) a first ethylene/α-olefin/nonconjugated polyene interpolymer; b) a second ethylene/α-olefin/nonconjugated polyene interpolymer; and wherein the first composition has the following properties: i) an MWD less than, or equal to, 3.5, ii) a Mooney Viscosity (ML (1+4, 125° C.)) greater than, or equal to, 60, iii) a CCDB from 7 to 15; B) a thermoplastic polymer; C) a vulcanization agent; and wherein the first interpolymer and the second interpolymer comprise incorporated oil.

18 Claims, No Drawings

ETHYLENE/ALPHA-OLEFIN/NONCONJUGATED POLYENE BASED COMPOSITIONS FOR THERMOPLASTIC VULCANIZATES

REFERENCE TO RELATED APPLICATIONS

This application claims the benefit of U.S. Provisional Application No. 61/665,982, filed Jun. 29, 2012.

BACKGROUND OF THE INVENTION

Thermoplastic vulcanizates ("TPV"s) formed from blends of crosslinked rubber and thermoplastic are known in the art. Morphologically, TPV are characterized by the presence of finely dispersed, micro-sized, rubber particles in a continuous thermoplastic matrix. The rubber phase is vulcanized with suitable curatives, typically by a dynamic vulcanization process. Compared with conventional, non-vulcanized, thermoplastic elastomers (TPEs), TPV materials exhibit better properties, such as heat resistance, oil resistance, and elastic recovery. Compared with thermoset rubbers, TPV materials have the advantage of thermoplastic processability and recyclability. TPVs have also gained wide acceptance as a replacement of both thermoset rubbers and flexible PVC (polyvinylchloride) in a variety of applications.

The physical properties of TPVs are affected by many factors, including the molecular structure of the rubber phase, the properties of the thermoplastic phase, the cure level, and the presence of fillers. Among them, the selection of the rubber phase is considered to have the largest impact on the final properties of the TPV. Ethylene-propylene-diene (EPDM) elastomers are the most widely used rubber in TPV formulations. The molecular microstructural features of EPDM, such as comonomer content, molecular weight, molecular weight distribution, diene content, and level of long chain branching (LCB), have significant influence on the final physical properties of the TPV. There is a need for new TPV formulations with improved dispersion of the rubber phase (more uniform dispersion of the rubber phase, and the rubber particles are smaller with increased interfacial area).

International Publication WO2009/123609 discloses a process for preparing a thermoplastic vulcanizate, the process comprising the following: charging a reactor with an olefinic copolymer rubber; charging the reactor, contemporaneously or sequentially with respect to the rubber, with a thermoplastic resin, an oil, and a cure system; melt mixing the rubber, the thermoplastic resin, the oil, and the cure system; and dynamically vulcanizing the rubber. The olefinic copolymer rubber is characterized by the following: a) a multimodal molecular weight, b) an average branching index of greater than 0.8, c) includes less than 10 parts by weight oil per 100 parts by weight rubber, d) includes less than 1 parts by weight non-rubber particulate, per 100 parts by weight rubber, and e) is in the form of granules having a particle size less than 8 mm.

U.S. Publication 2008/0033089 discloses a thermoplastic vulcanizate composition comprising a dynamically-cured rubber; from about 20 to about 300 parts, by weight, of a thermoplastic resin per 100 parts by weight rubber, and from about 30 to about 250 parts, by weight, additional oil per 100 parts by weight rubber. The rubber comprises a multimodal polymer composition cured with a curing agent. The multimodal polymer composition comprises 45 to 75 weight percent of a first polymer fraction, and 25 to 55 weight percent of a second polymer fraction, each comprising ethylene, a C3-C10 alpha-olefin, and a nonconjugated diene. The polymer fractions were polymerized using a Ziegler-Natta catalyst system, and the first polymer fraction has a Mooney viscosity of greater than, or equal to, about 150 ML(1+4 at 125° C.), and the second polymer fraction has a Mooney viscosity of about 20 ML to about 120 ML; and about 10 phr to about 50 phr of an extender oil.

Additional TPV and/or other formulations are described in the following: U.S. Pat. No. 7,655,727, 6,121,383, 4,130,535, 4,311,628, 4,593,062, U.S. 2007/0129493 A1, U.S. 2006/0199910 A1 (now U.S. Pat. No. 7,579,408), and EP0751182B1.

However, as discussed above, there is a need for new TPV with improved dispersion of the rubber. There is a further need for TPV formulations that have improved low temperature oil retention, and improved surface qualities. These needs have been met by the following invention.

SUMMARY OF THE INVENTION

The invention provides a composition comprising at least the following components:
A) an ethylene/α-olefin/nonconjugated polyene interpolymer that has the following properties:
  i) a rheology ratio (V0.1/V100 at 190° C.) greater than, or equal to, 35;
  ii) a weight average molecular weight (Mw) greater than, or equal to, 200,000 g/mol; and
  iii) a CCDB (Chemical Composition Distribution Breadth) less than 7;
B) a thermoplastic polymer;
C) a vulcanization agent; and
wherein the interpolymer comprises incorporated oil.

The invention also provides a composition comprising the following:
A) a first composition comprising:
  a) a first ethylene/α-olefin/nonconjugated polyene interpolymer;
  b) a second ethylene/α-olefin/nonconjugated polyene interpolymer; and
  wherein the first composition has the following properties:
    i) an MWD less than, or equal to, 3.5,
    ii) a Mooney Viscosity (ML (1+4, 125° C.)) greater than, or equal to, 60,
    iii) a CCDB from 7 to 15;
B) a thermoplastic polymer;
C) a vulcanization agent; and
wherein the first interpolymer and the second interpolymer comprise incorporated oil.

DETAILED DESCRIPTION OF THE INVENTION

As discussed above, the invention provides a composition comprising at least the following components:
A) an ethylene/α-olefin/nonconjugated polyene interpolymer that has the following properties:
  i) a rheology ratio (V0.1/V100 at 190° C.) greater than, or equal to, 35;
  ii) a weight average molecular weight (Mw) greater than, or equal to, 200,000 g/mol; and
  iii) a CCDB (Chemical Composition Distribution Breadth) less than 7;
B) a thermoplastic polymer;
C) a vulcanization agent; and
wherein the interpolymer comprises incorporated oil.

The inventive composition may comprise a combination of two or more embodiments described herein.

The rheology ratio (V0.1/V100 at 190° C.) is that of the neat polymer (no oil, no filler); polymer is typically stabilized with one or more antioxidants and/or other stabilizers.

In one embodiment, the ethylene/α-olefin/nonconjugated polyene interpolymer is an ethylene/α-olefin/diene interpolymer (EAODM). In a further embodiment, the interpolymer is an ethylene/propylene/diene terpolymer (EPDM). In a further embodiment, the diene is 5-ethylidene-2-norbornene (ENB).

In one embodiment, the incorporated oil is present in an amount from 10 to 200, further from 15 to 100, and further from 20 to 50 PHR (based on 100 parts of the ethylene/α-olefin/nonconjugated polyene). In a further embodiment, the interpolymer is an EAODM, and further an ethylene/propylene/diene (EPDM) terpolymer. In a further embodiment, the diene is 5-ethylidene-2-norbornene (ENB).

In one embodiment, the ethylene/α-olefin/nonconjugated polyene interpolymer has a weight average molecular weight (Mw) greater than, or equal to, 250,000 g/mole, further greater than, or equal to 300,000 g/mole, further greater than, or equal to 350,000 g/mole, further greater than, or equal to 400,000 g/mole. In a further embodiment, the interpolymer is an EAODM, and further an ethylene/propylene/diene (EPDM) terpolymer. In a further embodiment, the diene is 5-ethylidene-2-norbornene (ENB).

In one embodiment, the ethylene/α-olefin/nonconjugated polyene interpolymer has a weight average molecular weight (Mw) less than, or equal to, 1,000,000 g/mole, further less than, or equal to, 800,000 g/mole, further less than, or equal to, 600,000 g/mole. In a further embodiment, the interpolymer is an EAODM, and further an ethylene/propylene/diene (EPDM) terpolymer. In a further embodiment, the diene is 5-ethylidene-2-norbornene (ENB).

In one embodiment, the ethylene/α-olefin/nonconjugated polyene interpolymer has a weight average molecular weight (Mw) from 200,000 to 325,000 g/mole. In a further embodiment, the interpolymer is an EAODM, and further an ethylene/propylene/diene (EPDM) terpolymer. In a further embodiment, the diene is 5-ethylidene-2-norbornene (ENB).

In one embodiment, the ethylene/α-olefin/nonconjugated polyene interpolymer has a CCDB less than, or equal to, 6, and further less than, or equal to, 5. In a further embodiment, the interpolymer is an EAODM, and further an ethylene/propylene/diene (EPDM) terpolymer. In a further embodiment, the diene is 5-ethylidene-2-norbornene (ENB).

In one embodiment, the ethylene/α-olefin/nonconjugated polyene interpolymer a Mooney Viscosity greater than, or equal to, 60, further greater than, or equal to, 80 (ML1+4, 125° C.). Mooney viscosity is that of the neat polymer (no oil, no filler); polymer is typically stabilized with one or more antioxidants and/or other stabilizers. In a further embodiment, the interpolymer is an EAODM, and further an ethylene/propylene/diene (EPDM) terpolymer. In a further embodiment, the diene is 5-ethylidene-2-norbornene (ENB).

In one embodiment, the ethylene/α-olefin/nonconjugated polyene interpolymer comprises from 55 to 72 weight percent ethylene, further from 60 to 70 weight percent ethylene, and further from 60 to 66 weight percent ethylene, based on the weight of the interpolymer. In a further embodiment, the interpolymer is an EAODM, and further an ethylene/propylene/diene (EPDM) terpolymer. In a further embodiment, the diene is 5-ethylidene-2-norbornene (ENB).

In one embodiment, the ethylene/α-olefin/nonconjugated polyene interpolymer comprises from 55 to 70 weight percent ethylene, further from 55 to 68 weight percent ethylene, and further from 58 to 66 weight percent ethylene, based on the weight of the interpolymer. In a further embodiment, the interpolymer is an EAODM, and further an ethylene/propylene/diene (EPDM) terpolymer. In a further embodiment, the diene is 5-ethylidene-2-norbornene (ENB).

In one embodiment, the ethylene/α-olefin/nonconjugated polyene interpolymer comprises from 1 to 8 weight percent polyene, further from 2 to 7 weight percent polyene, and further from 3 to 6 weight percent polyene, based on the weight of the interpolymer. In a further embodiment, the polyene is a diene. In a further embodiment, the diene is 5-ethylidene-2-norbornene (ENB).

In one embodiment, the ethylene/α-olefin/nonconjugated polyene interpolymer has a MWD less than, or equal to, 4.0, further less than, or equal to 3.5. In a further embodiment, the interpolymer is an EAODM, further an ethylene/propylene/diene (EPDM) terpolymer. In a further embodiment, the diene is 5-ethylidene-2-norbornene (ENB).

In one embodiment, the ethylene/α-olefin/nonconjugated polyene interpolymer has a peak area from 21.3 ppm to 21.8 ppm greater than 3 percent, further greater than, or equal to, 5 percent, and further greater than, or equal to, 7 percent, of the total integral area from 19.5 ppm to 22.0 ppm, as determined by 13C NMR. In a further embodiment, the interpolymer is an EAODM, further an ethylene/propylene/diene (EPDM) terpolymer. In a further embodiment, the diene is 5-ethylidene-2-norbornene (ENB).

In one embodiment, the ethylene/α-olefin/nonconjugated polyene interpolymer has a peak area from 21.3 ppm to 21.8 ppm greater than 7 percent, further greater than, or equal to, 8 percent, and further greater than, or equal to, 9 percent, of the total integral area from 19.5 ppm to 22.0 ppm, as determined by 13C NMR. In a further embodiment, the interpolymer is an EAODM, further an ethylene/propylene/diene (EPDM) terpolymer. In a further embodiment, the diene is 5-ethylidene-2-norbornene (ENB).

In one embodiment, the ethylene/α-olefin/nonconjugated polyene interpolymer is present in an amount greater than 40 weight percent, further greater than, or equal to, 50 weight percent, and further greater than, or equal to, 60 weight percent, based on the weight of the composition. In a further embodiment, the interpolymer is an EAODM, further an ethylene/propylene/diene (EPDM) terpolymer. In a further embodiment, the diene is 5-ethylidene-2-norbornene (ENB).

In one embodiment, the ethylene/α-olefin/nonconjugated polyene interpolymer is present in an amount greater than 50 weight percent, further greater than, or equal to, 60 weight percent, and further greater than, or equal to, 70 weight percent, based on the weight of the composition. In a further embodiment, the interpolymer is an EAODM, further an ethylene/propylene/diene (EPDM) terpolymer. In a further embodiment, the diene is 5-ethylidene-2-norbornene (ENB).

The ethylene/α-olefin/nonconjugated polyene interpolymer, further an EAODM, and further an EPDM, may comprise a combination of two or more embodiments as described herein.

In one embodiment, the thermoplastic polymer is present in an amount less than 60 weight percent, further less than, or equal to, 50 weight percent, and further less than, or equal to 40 weight percent, based on the weight of the composition.

In one embodiment, the thermoplastic polymer is present in an amount less than 50 weight percent, further less than, or equal to, 40 weight percent, and further less than, or equal to, 30 weight percent, based on the weight of the composition.

In one embodiment, the thermoplastic polymer of Component B is a propylene-based polymer.

The invention also provides a composition comprising the following:

A) a first composition comprising:
  a) a first ethylene/α-olefin/nonconjugated polyene interpolymer;
  b) a second ethylene/α-olefin/nonconjugated polyene interpolymer; and
  wherein the first composition has the following properties:
    i) an MWD less than, or equal to, 3.5,
    ii) a Mooney Viscosity (ML (1+4, 125° C.)) greater than, or equal to, 60,
    iii) a CCDB from 7 to 15;
B) a thermoplastic polymer;
C) a vulcanization agent; and
wherein the first interpolymer and the second interpolymer comprise incorporated oil.

The inventive composition may comprise a combination of two or more embodiments described herein.

The first ethylene/α-olefin/nonconjugated polyene interpolymer differs from the second ethylene/α-olefin/nonconjugated polyene interpolymer in one or more properties, including, but not limited to, Mooney viscosity, MWD, rheology ratio, ethylene content, and/or polyene content.

In one embodiment, the first and second ethylene/α-olefin/nonconjugated polyene interpolymers are each, independently, an ethylene/α-olefin/dene interpolymer (EAODM). In a further embodiment, each interpolymer is independently an ethylene/propylene/diene terpolymer (EPDM). In a further embodiment, the diene is 5-ethylidene-2-norbornene (ENB).

In one embodiment, the incorporated oil is present in an amount from 10 to 200, further from 15 to 100, and further from 20 to 50 PHR (based on 100 parts sum of the first ethylene/α-olefin/nonconjugated polyene and the second ethylene/α-olefin/nonconjugated polyene). In a further embodiment, each interpolymer is independently an EAODM, and further an ethylene/propylene/diene (EPDM) terpolymer. In a further embodiment, the diene is 5-ethylidene-2-norbornene (ENB).

Mooney viscosity is that of the neat polymer (no oil, no filler); polymer is typically stabilized with one or more antioxidants and/or other stabilizers.

In one embodiment, the first composition has a Mooney Viscosity greater than, or equal to, 80 (ML 1+4, 125° C.). In a further embodiment, the first and second interpolymers are each, independently, an EAODM, and further an ethylene/propylene/diene (EPDM) terpolymer. In a further embodiment, the diene is 5-ethylidene-2-norbornene (ENB).

In one embodiment, the first composition has a rheology ratio (V0.1/V100 at 190° C.) greater than, or equal to, 35, further greater than, or equal to, 40. The rheology ratio (V0.1/V100 at 190° C.) is that of the neat polymer (no oil, no filler); polymer is typically stabilized with one or more antioxidants and/or other stabilizers. In a further embodiment, the first and second interpolymers are each, independently, an EAODM, further an ethylene/propylene/diene (EPDM) terpolymers. In a further embodiment, the diene is 5-ethylidene-2-norbornene (ENB).

In one embodiment, the first composition has a weight average molecular weight (Mw) greater than, or equal to, 200,000 g/mole. In a further embodiment, the first and second interpolymers are each, independently, an EAODM, further an ethylene/propylene/diene (EPDM) terpolymers. In a further embodiment, the diene is 5-ethylidene-2-norbornene (ENB).

In one embodiment, the first composition has a weight average molecular weight (Mw) greater than, or equal to, 250,000 g/mole, further greater than, or equal to 300,000 g/mole, further greater than, or equal to 350,000 g/mole, further greater than, or equal to 400,000 g/mole. In a further embodiment, the first and second interpolymers are each, independently, an EAODM, further an ethylene/propylene/diene (EPDM) terpolymers. In a further embodiment, the diene is 5-ethylidene-2-norbornene (ENB).

In one embodiment, the first composition has a weight average molecular weight (Mw) less than, or equal to, 1,000,000 g/mole, further less than, or equal to, 800,000 g/mole, further less than, or equal to, 600,000 g/mole. In a further embodiment, the first and second interpolymers are each, independently, an EAODM, further an ethylene/propylene/diene (EPDM) terpolymers. In a further embodiment, the diene is 5-ethylidene-2-norbornene (ENB).

In one embodiment, the first composition has a weight average molecular weight (Mw) from 200,000 to 325,000 g/mole. In a further embodiment, the first and second interpolymers are each, independently, an EAODM, further an ethylene/propylene/diene (EPDM) terpolymers. In a further embodiment, the diene is 5-ethylidene-2-norbornene (ENB).

In one embodiment, the first composition has a peak area from 21.3 ppm to 21.8 ppm greater than 3 percent, further greater than, or equal to, 5 percent, and further greater than, or equal to 7 percent, of the total integral area from 19.5 ppm to 22.0 ppm, as determined by 13C NMR. In a further embodiment, the first and second interpolymers are each, independently, an EAODM, further an ethylene/propylene/diene (EPDM) terpolymers. In a further embodiment, the diene is 5-ethylidene-2-norbornene (ENB).

The first composition may comprise a combination of two or more embodiments as described herein.

The first ethylene/α-olefin/nonconjugated polyene interpolymer, further an EAODM, and further an EPDM, may comprise a combination of two or more embodiments as described herein.

The second ethylene/α-olefin/nonconjugated polyene interpolymer, further an EAODM, and further an EPDM, may comprise a combination of two or more embodiments as described herein.

In one embodiment, the thermoplastic polymer of Component B is a propylene-based polymer.

The following embodiment and descriptions herein apply to all inventive compositions described herein.

In one embodiment, the vulcanization agent is selected from the group consisting of phenolic resins.

In one embodiment, the vulcanization agent is present in an amount from 0.1 to 5 weight percent, based on the weight of the composition.

The invention also provides a crosslinked composition formed from an inventive composition described herein.

In one embodiment, an inventive composition further comprises a filler. Suitable fillers include, but are not limited to, clay, CaCO3, talc, and mineral fibers.

In one embodiment, the filler is present in an amount from 5 to 30 weight percent, based on the weight of the composition.

In one embodiment, an inventive composition further comprises at least one stabilizer. Suitable stabilizers include, but are not limited to, AO and UV stabilizers.

In one embodiment, the at least one stabilizer is present in an amount from 0.1 to 1 weight percent, based on the weight of the composition.

The invention also provides an article comprising at least one component formed from an inventive composition described herein. In a further embodiment, the article is selected from the group consisting of profiles, injection molded parts, gaskets, shoe components and tubes.

An inventive composition may comprise a combination of two or more embodiments as described herein.

An inventive article may comprise a combination of two or more embodiments as described herein.

Ethylene/α-Olefin/Nonconjugated Polyenes Interpolymers

The ethylene/α-olefin/non-conjugated polyene interpolymers (including the first and second interpolymers), for the inventive compositions described herein, comprise, in polymerize form, ethylene, an α-olefin, and a non-conjugated polyene. Suitable examples of α-olefins include the C3-C20 α-olefins, and preferably propylene. Suitable examples of nonconjugated polyenes include the C4-C40 nonconjugated dienes.

The α-olefin may be either an aliphatic or an aromatic compound. The α-olefin is preferably a C3-C20 aliphatic compound, preferably a C3-C16 aliphatic compound, and more preferably a C3-C10 aliphatic compound. Preferred C3-C10 aliphatic α-olefins are selected from the group consisting of propylene, 1-butene, 1-hexene and 1-octene, and more preferably propylene. In a further embodiment, the interpolymer is an ethylene/propylene/diene (EPDM) terpolymer. In a further embodiment, the diene is 5-ethylidene-2-norbornene (ENB).

Illustrative nonconjugated polyenes include straight chain acyclic dienes, such as 1,4-hexadiene and 1,5-heptadiene; branched chain acyclic dienes, such as 5-methyl-1,4-hexadiene, 2-methyl-1,5-hexadiene, 6-methyl-1,5-heptadiene, 7-methyl-1,6-octadiene, 3,7-dimethyl-1,6-octadiene, 3,7-dimethyl-1,7-octadiene, 5,7-dimethyl-1,7-octadiene, 1,9-decadiene, and mixed isomers of dihydromyrcene; single ring alicyclic dienes such as 1,4-cyclohexadiene, 1,5-cyclooctadiene and 1,5-cyclododecadiene; multi-ring alicyclic fused and bridged ring dienes, such as tetrahydroindene, methyl tetrahydroindene; alkenyl, alkylidene, cycloalkenyl and cycloalkylidene norbornenes such as 5-methylene-2-norbornene (MNB), 5-ethylidene-2-norbornene (ENB), 5-vinyl-2-norbornene, 5-propenyl-2-norbornene, 5-isopropylidene-2-norbornene, 5-(4-cyclopentenyl)-2-norbornene, and 5-cyclohexylidene-2-norbornene. The polyene is preferably a nonconjugated diene selected from the group consisting of ENB, dicyclopentadiene, 1,4-hexadiene, 7-methyl-1,6-octadiene, and preferably, ENB, dicyclopentadiene and 1,4-hexadiene, more preferably ENB and dicyclopentadiene, and even more preferably ENB.

In one embodiment, the ethylene/α-olefin/nonconjugated polyene interpolymer comprises a majority amount of polymerized ethylene, based on the weight of the interpolymer. In a further embodiment, the ethylene/α-olefin/nonconjugated polyene interpolymer is an ethylene/α-olefin/diene interpolymer. In a further embodiment, the interpolymer is an EPDM. In a further embodiment, the diene is ENB.

In one embodiment, the ethylene/α-olefin/nonconjugated polyene interpolymer has a molecular weight distribution (Mw/Mn) from 1.7 to 5.0, or from 2.0 to 4.0, or from 2.5 to 3.5. In a further embodiment, the ethylene/α-olefin/nonconjugated polyene interpolymer is an ethylene/α-olefin/diene interpolymer (EAODM). In a further embodiment, the interpolymer is an EPDM. In a further embodiment, the diene is ENB.

In one embodiment, the ethylene/α-olefin/nonconjugated polyene interpolymer has a Mooney viscosity, ML(1+4) at 125° C., greater than, or equal to, 60, or greater than, or equal to, 70, or greater than, or equal to 80, or greater than, or equal to 90. In a further embodiment, the ethylene/α-olefin/nonconjugated polyene interpolymer is an ethylene/α-olefin/dene interpolymer. In a further embodiment, the interpolymer is an EPDM. In a further embodiment, the diene is ENB.

In one embodiment, the ethylene/α-olefin/nonconjugated polyene interpolymer has a Mooney viscosity, ML(1+4) at 125° C., less than 500, or less than, or equal to, 300, or less than, or equal to, 200. In a further embodiment, the ethylene/α-olefin/nonconjugated polyene interpolymer is an ethylene/α-olefin/dene interpolymer. In a further embodiment, the interpolymer is an EPDM. In a further embodiment, the diene is ENB.

In one embodiment, the ethylene/α-olefin/nonconjugated polyene interpolymer has a Mooney viscosity, ML(1+4) at 125° C., from 60 to 500, or from 70 to 300, or from 80 to 200. In a further embodiment, the ethylene/α-olefin/nonconjugated polyene interpolymer is an ethylene/α-olefin/dene interpolymer. In a further embodiment, the interpolymer is an EPDM. In a further embodiment, the diene is ENB.

Mooney viscosity is that of the neat interpolymer (or calculated viscosity of neat polymer for polymers that contain a filler, such as carbon black, and/or an oil). The neat polymer refers to the polymer without filler and without oil.

In one embodiment, the ethylene/α-olefin/nonconjugated polyene interpolymer is a colorable interpolymer. In a further embodiment, the ethylene/α-olefin/nonconjugated polyene interpolymer is an ethylene/α-olefin/dene interpolymer. In a further embodiment, the interpolymer is an EPDM. In a further embodiment, the diene is ENB.

An ethylene/α-olefin/nonconjugated polyene interpolymer may comprise a combination of two or more embodiments as described herein.

An ethylene/alpha-olefin/diene interpolymer may comprise a combination of two or more embodiments as described herein.

An EPDM terpolymer may comprise a combination of two or more embodiments as described herein.

Thermoplastic Polymers

Thermoplastic polymers include, but are not limited to, propylene-based polymers, ethylene-based polymers, and polyesters.

In one embodiment, the thermoplastic polymer is present in an amount from 20 to 150, further from 25 to 100, and further from 30 to 50 PHR (based on 100 parts of the ethylene/α-olefin/nonconjugated polyene or based on 100 parts sum of the first ethylene/α-olefin/nonconjugated polyene interpolymer and the second ethylene/α-olefin/nonconjugated polyene interpolymer).

In one embodiment, the thermoplastic polymer has a weight average molecular weight (Mw) from 10,000 to 1,000,000 g/mol, further from 20,000 to 500,000 g/mole, and further from 50,000 to 300,000 g/mole.

A thermoplastic polymer may comprise a combination of two or more embodiments as described herein In one embodiment, the thermoplastic polymer is a propylene-based polymer. Suitable propylene-based polymers include, but are not limited to, polypropylene homopolymers, propylene/ethylene copolymers, propylene/α-olefin copolymers, and impact modified polypropylene.

In one embodiment, the propylene-based polymer is post-modified using a vis-breaking process.

In one embodiment, the propylene-based polymer has a melting point (Tm), as determined by DSC greater than, or equal to, 140° C., further greater than, or equal to, 150° C., and further greater than, or equal to, 160° C.

In one embodiment, the propylene-based polymer has a melting point from 140° C. to 165° C., further from 150 to 165° C., and further from 160 to 165° C., as determined by DSC.

In one embodiment, the propylene-based polymer has a density from 0.87 to 0.91 g/cc, and further from 0.88 to 0.90 g/cc (1 cc=1 cm$^3$).

In one embodiment, the propylene-based polymer has a melt flow rate (MFR) from 0.5 to 100 g/10 min, further from 0.5 to 50 g/10 min, further from 0.5 to 10 g/10 min, and further 0.5 to 5 g/10 min, as determined by ASTM D 1238 (230° C./2.16 kg).

In one embodiment, the propylene-based polymer has a molecular weight distribution (MWD) from 1.7 to 10, further from 1.8 to 5, and further from 2 to 3.5.

In one embodiment, the propylene-based polymer is a propylene/α-olefin copolymer. Examples of suitable α-olefins include, but are not limited to, isobutylene, 1-butene, 1-pentene, 1-hexene, 4-methyl-1-pentene, and 1-octene, and further 1-butene, 1-hexene, and 1-octene.

In one embodiment, the propylene/α-olefin copolymer has a melting point (Tm), as determined by DSC greater than, or equal to, 80° C., further greater than, or equal to, 100° C., and further greater than, or equal to, 120° C.

In one embodiment, the propylene-based polymer is a propylene/ethylene copolymer.

In one embodiment, the propylene/ethylene copolymer comprises greater than, or equal to, 90 wt %, or greater than, or equal to, 92 wt %, or greater than, or equal to, 94 wt %, or greater than, or equal to, 96 wt %, or greater than, or equal to, 98 wt % of polymerized propylene, based on the weight of the copolymer.

In one embodiment, the propylene/ethylene copolymer comprises less than, or equal to, 10 wt %, or less than, or equal to, 8 wt %, or less than, or equal to, 6 wt %, or less than, or equal to, 4 wt %, or less than, or equal to, 2 wt % of polymerized ethylene, based on the weight of the copolymer.

In one embodiment, the propylene/ethylene copolymer has a melting point (Tm), as determined by DSC greater than, or equal to, 80° C., further greater than, or equal to, 100° C., and further greater than, or equal to, 120° C.

In one embodiment, the propylene-based polymer is a polypropylene homopolymer.

Suitable propylene-based polymers include, but are not limited to, BRASKEM Propylene H110-02N, VERSIFY Plastomers and Elastomers (for example, VERSIFY 2000 Plastomer, VERSIFY 2200 Plastomer), and VISTAMAXX Polymers (for example, VISTAMAXX 3000).

A propylene-based polymer may comprise a combination of two or more embodiments as described herein.

A propylene/α-olefin copolymer may comprise a combination of two or more embodiments as described herein. A propylene/ethylene copolymer may comprise a combination of two or more embodiments as described herein. A polypropylene homopolymer may comprise a combination of two or more embodiments as described herein.

In one embodiment, the thermoplastic polymer is an ethylene-based polymer. Suitable ethylene-base polymers include, but are not limited to, high density polyethylene (HDPE), low density polyethylene (LDPE), linear low density polyethylene (LLDPE), very low density polyethylene (VLDPE), ultra low density polyethylene (ULDPE), homogeneously branched linear ethylene polymers, and homogeneously branched substantially linear ethylene polymers (that is homogeneously branched, long chain branched ethylene polymers).

In one embodiment, the ethylene-based polymer has a density from 0.900 to 0.965 g/cc, and further from 0.910 to 0.960 g/cc.

In one embodiment, the ethylene-based polymer has a melt index (I2) from 0.5 to 100 g/10 min, further from 0.5 to 50 g/10 min, further from 0.5 to 10 g/10 min, and further 0.5 to 5 g/10 min, as determined by ASTM D 1238 (190° C./2.16 kg).

In one embodiment, the ethylene-based polymer has a molecular weight distribution (MWD) from 1.7 to 30, further from 1.7 to 10, and further from 1.7 to 5.

In one embodiment, the ethylene-based polymer is a polyethylene homopolymer.

In one embodiment, the ethylene-based polymer is an ethylene/α-olefin copolymer. In a further embodiment, the α-olefin is a C3-C10 α-olefin. Suitable α-olefins include propylene, 1-butene, 1-hexene and 1-octene.

Some commercial examples of suitable ethylene-base polymers include commercially available HDPE, commercially available LDPE, ATTANE, AFFINITY, DOWLEX, FLEXOMER, ELITE, all available from The Dow Chemical Company; and EXCEED and EXACT available from ExxonMobil Chemical Company.

In one embodiment, the ethylene-based polymer is an ethylene multi-block copolymer. For example, see WO 2005/090427, US2006/0199931, US2006/0199930, US2006/0199914, US2006/0199912, and US2006/0199911, each publication is incorporated herein by reference.

A ethylene-based polymer may comprise a combination of two or more embodiments as described herein. An ethylene/α-olefin copolymer may comprise a combination of two or more embodiments as described herein. A polyethylene homopolymer may comprise a combination of two or more embodiments as described herein.

Oils

Oils include, but are not limited to, petroleum oils, such as aromatic and naphthenic oils; polyalkylbenzene oils; organic acid monoesters, such as alkyl and alkoxyalkyl oleates and stearates; organic acid diesters, such as dialkyl, dialkoxyalkyl, and alkyl aryl phthalates, terephthalates, sebacates, adipates, and glutarates; glycol diesters, such as tri-, tetra-, and polyethylene glycol dialkanoates; trialkyl trimellitates; trialkyl, trialkoxyalkyl, alkyl diaryl, and triaryl phosphates; chlorinated paraffin oils; coumarone-indene resins; pine tars; vegetable oils, such as castor, tall, rapeseed, and soybean oils and esters and epoxidized derivatives thereof; and the like.

In one embodiment, the oil is present in an amount from 5 to 70 weight percent, further from 5 to 50 weight percent, based on the weight of the composition.

In one embodiment, the oil is selected from the group consisting of nonaromatic oils, paraffinic oils, naphthenic oils, and combinations thereof. Suitable oils include, but are not limited to, PARALUX 6001, HYDROBRITE 550, and CALSOL.

An oil may comprise a combination of two or more embodiments as described herein.

Vulcanization Agents

The inventive composition further comprises a vulcanization agent. A preferred vulcanization agent is phenolic resin. Other curing agents include, but are not limited to, peroxides, azides, aldehyde-amine reaction products, vinyl silane grafted moieties, hydrosilylation, substituted ureas, substituted guanidines; substituted xanthates; substituted dithiocarbamates; sulfur-containing compounds, such as thiazoles, imidazoles, sulfenamides, thiuramidisulfides, para-quinonedioxime, dibenzoparaquinonedioxime, sulfur; and combinations thereof. See Encyclopedia of Chemical Technology, Vol. 17, 2nd edition, Interscience Publishers, 1968; also Organic Peroxides, Daniel Seem, Vol. 1, Wiley-Interscience, 1970), which are incorporated by reference herein in their entirety.

The vulcanization agent may be a phenolic curing agent (and, optional, cure accelerator stannous chloride), or a peroxide curing agent, with an optional co-agent, or hydrosilylation cross-linking agent with a hydrosilylation catalyst, or dibutyl tin dilaurate ("DBTDL"), with an optional co-agent alumina trihydrate ("ATH"), for silane-grafted interpolymer. A phenolic resin, cure accelerator stannous chloride and acid scavenger zinc oxide can be used for EPDM curing (peroxide, or sulphur or hydrosilation curing systems can also be used).

Any phenolic curative system which can fully cure EPDM rubber is suitable. While it is preferred to fully cure the elastomer, it is not always necessary. In some embodiments, the elastomer is partially cured or substantially cured. A basic ingredient of such system is a phenolic curing resin made by condensation of halogen substituted phenol, $C_1$-$C_{10}$ alkyl substituted phenol or unsubstituted phenol with an aldehyde, preferably, formaldehyde, in an alkaline medium or by condensation of bifunctional phenoldialcohols. Dimethylol phenols substituted in the para-position with $C_5$-$C_{10}$ alkyl groups are preferred. Halogenated alkyl substituted phenol curing resins prepared by halogenation of alkyl substituted phenol curing resin are also especially suitable. Phenolic curative systems comprising methylol phenolic resins, halogen donor and metal compound are especially recommended, details of which are described in Giller, U.S. Pat. No. 3,287,440 and Gerstin et al, U.S. Pat. No. 3,709,840, which are incorporated by reference herein in their entirety. Another suitable class of phenolic curative system is disclosed in U.S. Pat. No. 5,952,421, which is incorporated by reference herein in its entirety.

In addition to phenolic curatives, azides may also be used as cross-linking agents. Suitable azides include, but are not limited to, azidoformates, such as tetramethylenebis-(azidoformate) (see also U.S. Pat. No. 3,284,421, Breslow, Nov. 8, 1966); aromatic polyazides, such as 4,4'-diphenylmethane diazide (see, also, U.S. Pat. No. 3,297,674, Breslow et al., Jan. 10, 1967); and sulfonazides, such as p,p'-oxybis(benzene sulfonyl azide).

Suitable peroxides as vulcanization agents include, but are not limited to, aromatic dactyl peroxides; aliphatic dactyl peroxides; dibasic acid peroxides; ketene peroxides; alkyl peroxyesters; alkyl hydroperoxides (for example, diacetylperoxide; dibenzoylperoxide; bis-2,4-dichlorobenzoyl peroxide; di-tert-butyl peroxide; dicumylperoxide; tert-butyl-perbenzoate; tert-butylcumylperoxide; 2,5-bis (t-butylperoxy)-2,5-dimethylhexane; 2,5-bis (t-butylperoxy)-2,5-dimethylhexyne-3; 4,4,4',4'-tetra-(t-butylperoxy)-2,2-dicyclohexylpropane; 1,4-bis-(t-butylperoxyisopropyl)-benzene; 1,1-bis-(t-butylperoxy)-3,3,5-trimethyl-cyclohexane; lauroyl peroxide; succinic acid peroxide; cyclohexanone peroxide; t-butyl peracetate; butyl hydroperoxide; etc.

The vulcanizing elastomer may be grafted to a vinyl silane monomer, in the presence of a low level of peroxide, via a separate reactive extrusion process. Suitable vinyl silanes include, but are not limited to, vinyl trimethoxysilane, vinyl triethoxysilane. The grafted elastomer may then be reacted with water to cure the polymer in the presence of a catalyst such as dibutyl tin dilaurate during the dynamic vulcanization process. Suitable water sources include, but are not limited to, steam, water/ethylene glycol mixtures, aluminum trihydrate, and magnesium hydroxide.

Silicon hydride having at least two SiH groups in the molecule may be reacted with the carbon-carbon multiple bonds of the unsaturated rubber component in the presence of a hydrosilylation catalyst to form useful crosslinks during dynamic vulcanization. Suitable silicon hydride compounds include, but are not limited to, methylhydrogen polysiloxanes, methylhydrogen dimethyl-siloxane copolymers, methylhydrogen alkyl methyl polysiloxanes, bis(dimethylsilyl) alkanes and bis(dimethylsilyl)benzene. The amount of silicon hydride compound useful in the process of the composition can range from about 0.1 to about 10.0 mole equivalents of SiH per carbon-carbon double bond in the rubber, and preferably is in the range of about 0.5 to about 5.0 mole equivalents of SiH per carbon-carbon double bond in the rubber component of the thermoplastic elastomer. Suitable catalysts for the hydrosilylation vulcanization reaction include transition metals of Group VIII such as palladium, rhodium, platinum and the like, including complexes of these metals. Chrolorplatinic acid has been disclosed as an useful catalyst in U.S. Pat. Nos. 4,803,244 and 5,597,867. The use of hydrosilylation crosslinking to dynamically vulcanize EPDM to produce TPV's was disclosed in U.S. Pat. No. 6,251,998 (Medsker, et al., Jun. 26, 2001), which is incorporated by reference herein in its entirety.

A vulcanization agent may comprise a combination of two or more embodiments as described herein. The inventive composition can be pelletized. An inventive composition may comprise a combination of two or more embodiments as described herein.

Additives

An inventive composition may comprise one or more additional additives. Suitable additives include, but are not limited to, fillers, antioxidants, UV stabilizers, flame retardants, colorants or pigments, and combinations thereof.

Fillers include, but are not limited to, silicates of aluminum, magnesium, calcium, sodium, potassium and mixtures thereof; carbonates of calcium, magnesium and mixtures thereof; oxides of silicon, calcium, zinc, iron, titanium, and aluminum; sulfates of calcium, barium, and lead; alumina trihydrate; magnesium hydroxide; natural fibers, synthetic fibers, and the like.

Some antioxidants and antiozonants include, but are not limited to, hindered phenols, bisphenols, and thiobisphenols; and substituted hydroquinones. Foaming agents, such as azodicarbonamide, can be used for making a foam structure.

Applications

The compositions of the present invention may be used to prepare a variety of articles or manufacture, or their component parts or portions. The inventive compositions may be converted into a finished article of manufacture by any one of a number of conventional processes and apparatus. Illustrative processes include, but are not limited to, extrusion, calendering, compression molding, and other typical thermoset material forming processes.

Articles include, but are not limited to, sheets, foams, molded goods, and extruded parts. Additional articles include automotive parts, weather strips, belts, hoses, building profiles, wire and cable jacketing, flooring materials, gaskets, tires and tire components, computer parts, building materials and footwear components. A skilled artisan can readily augment this list without undue experimentation.

Definitions

Unless stated to the contrary, implicit from the context, or customary in the art, all parts and percents are based on weight, and all test methods are current as of the filing date of this disclosure.

The term "composition," as used herein, includes a mixture of materials, which comprise the composition, as well as reaction products and decomposition products formed from the materials of the composition. Any reaction product or decomposition product is typically present in trace or residual amounts.

The term "polymer," as used herein, refers to a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure) and the term interpolymer as defined hereinafter. Trace amounts of impurities, such as catalyst residues, may be incorporated into and/or within a polymer.

The term "interpolymer," as used herein, refers to polymers prepared by the polymerization of at least two different types of monomers. The term interpolymer thus includes the term copolymer (employed to refer to polymers prepared from two different types of monomers) and polymers prepared from more than two different types of monomers.

The term "ethylene-based polymer," as used herein, refers to a polymer that comprises, in polymerized form, a majority weight percent of ethylene (based on the weight of the polymer), and optionally may comprise one or more comonomers.

The term "ethylene-based interpolymer," as used herein, refers to a polymer that comprises, in polymerized form, a majority weight percent of ethylene (based on the weight of the interpolymer), and at least one comonomer.

The term "ethylene/α-olefin/nonconjugated polyene interpolymer," as used herein, refers to a polymer that comprises, in polymerized form, ethylene, an α-olefin, and a nonconjugated polyene. In one embodiment, the "ethylene/α-olefin/nonconjugated polyene interpolymer" comprises a majority weight percent of ethylene (based on the weight of the interpolymer).

The term "ethylene/α-olefin/diene interpolymer," as used herein, refers to a polymer that comprises, in polymerized form, ethylene, an α-olefin, and a diene. In one embodiment, the "ethylene/α-olefin/diene interpolymer" comprises a majority weight percent of ethylene (based on the weight of the interpolymer).

The term, "ethylene/α-olefin copolymer," as used herein, refers to a copolymer that comprises, in polymerized form, a majority amount of ethylene monomer (based on the weight of the copolymer), and an α-olefin, as the only two monomer types.

The term, "propylene-based polymer," as used herein, refers to a polymer that comprises, in polymerized form, a majority amount of propylene monomer (based on the weight of the polymer), and optionally may comprise one or more comonomers.

The term, "propylene/α-olefin copolymer," as used herein, refers to a copolymer that comprises, in polymerized form, a majority amount of propylene monomer (based on the weight of the copolymer), and an α-olefin, as the only two monomer types.

The term, "propylene/ethylene copolymer," as used herein, refers to a copolymer that comprises, in polymerized form, a majority amount of propylene monomer (based on the weight of the copolymer), and ethylene, as the only two monomer types.

The term "incorporated oil," as used herein, refers to oil contained within an ethylene/α-olefin/nonconjugated polyene interpolymer.

The terms "comprising," "including," "having," and their derivatives, are not intended to exclude the presence of any additional component, step or procedure, whether or not the same is specifically disclosed. In order to avoid any doubt, all compositions claimed through use of the tem "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

TEST METHODS

Mooney Viscosity

The Mooney viscosity of the interpolymer [ethylene/α-olefin/nonconjugated polyene interpolymer (e.g., EPDM) with no filler and no oil) or ethylene/α-olefithonconjugated polyene interpolymer (e.g., EPDM) with oil-extender Mooney Viscosity (ML1+4 at 125° C.)] is measured in accordance with ASTM 1646-04, with a one minute preheat time and a four minute rotor operation time. The instrument is an Alpha Technologies Rheometer MDR 2000.

Mooney Viscosity (no filler, no oil) versus Mw (weight avg. MW) can be estimated by the following equation: MV(ML 1+4 at 125° C.)=147.82 In(Mw)−1697.3.

Oil-Extended Mooney Viscosity (OE MV) versus Mooney Viscosity (no filler, no oil) can be estimated by the following equation:

$$\text{OE MV(ML1+4 at 125° C.)} = \{[\text{MV(ML 1+4 at 125° C.)}] \times [100/(100+\text{phr oil})]^{2.8}\}.$$

Gel Permeation Chromatography

The chromatographic system consisted of either a Polymer Laboratories Model PL-210 or a Polymer Laboratories Model PL-220. The column and carousel compartments were operated at 140° C. The columns were three Polymer Laboratories, 10-micron Mixed-B columns The solvent used was 1,2,4 trichlorobenzene. The samples were prepared at a concentration of "0.1 gram of polymer in 50 milliliters of solvent." The solvent used to prepare the samples contained "200 ppm of butylated hydroxytoluene (BHT)." Samples were prepared by agitating lightly for two hours at 160° C. The injection volume was 100 microliters, and the flow rate was 1.0 milliliters/minute.

Calibration of the GPC column set was performed with 21 "narrow molecular weight distribution polystyrene standards," with molecular weights ranging from 580 to 8,400,000, arranged in six "cocktail" mixtures, with at least a decade of separation between individual molecular weights. The standards were purchased from Polymer Laboratories (Shropshire, UK). The polystyrene standards were prepared at "0.025 grams in 50 milliliters of solvent" for molecular weights equal to, or greater than, 1,000 kg/mol, and "0.05 grams in 50 milliliters of solvent" for molecular weights less than 1,000 kg/mol. The polystyrene standards were dissolved at 80 degrees Celsius, with gentle agitation, for 30 minutes. The narrow standards mixtures were run first, and in order of decreasing "highest molecular weight" component to minimize degradation. The polystyrene standard peak molecular weights were converted to polyethylene molecular weights using the following equation: $M_{polyethylene} = A \times (M_{polystyrene})^B$, where M is the molecular weight, A has a value of 0.431 and B is equal to 1.0 (as described in Williams and Ward, *J. Polym. Sc., Polym. Let.*, 6, 621 (1968)). Polyethylene equivalent molecular weight calculations were performed using Viscotek TriSEC software Version 3.0.

FTIR Method for EPDM Composition Analysis

The terpolymers containing ethylene, propylene, and 5-ethylidene-2-norbornene were analyzed using ASTM D9300 for its ethylene content, and ASTM D6047 for its ethylidene-norbornene or dicyclopentadiene content.

C13 NMR Method for EPDM Composition Analysis

The samples were prepared by adding approximately "2.6 g" of a "50/50 mixture of tetrachloroethane-d2/orthodichlorobenzene" that is "0.025M" in chromium acetylacetonate (relaxation agent) to "0.2 g sample" in a 10 mm NMR tube. The samples were dissolved, and homogenized, by heating the tube and its contents to 150° C. The data were collected using a Bruker 400 MHz spectrometer, equipped with a Bruker Dual DUL high-temperature CryoProbe. The data was acquired using "160 scans per data file," a six second pulse repetition delay, with a sample temperature of 120° C. The acquisition was carried out using a spectral width of 25,000 Hz and a file size of 32K data points.

NMR spectral analysis of the composition of the examples was carried out using the following analysis method. Quantitation of monomers present in EPDM can be calculated using the following equations (1 through 9).

The calculation of moles ethylene normalizes the spectral range from 55.0-5.0 ppm to 1000 integral units. The contribution under the normalized integral area only accounts for 7 of the ENB carbons. The ENB diene peaks at 111 and 147 ppm are excluded from the calculation due to concerns that double bonds may react at high temperatures.

$$molesEth = \frac{(1000 - 3 * molesP - 7 * molesENB)}{2} \quad \text{Equation 1}$$

$$molesENB = CH3(13.6 - 14.7 \text{ ppm}) \quad \text{Equation 2}$$

$$molesP = CH3(19.6 - 22.0 \text{ ppm}) \quad \text{Equation 3}$$

$$\text{mole \% ethylene} = \frac{100 * molesE}{molesE + molesP + molesENB} \quad \text{Equation 4}$$

$$\text{mole \% propylene} = \frac{100 * molesP}{molesE + molesP + molesENB} \quad \text{Equation 5}$$

$$\text{mole \% ENB} = \frac{100 * molesENB}{molesE + molesP + molesENB} \quad \text{Equation 6}$$

$$\text{Wt \% ethylene} = \frac{100 * \text{mole \% } E * 28}{\text{mole \% } E * 28 + \text{mole \% } P * 42 + \text{mole \% } ENB * 120} \quad \text{Equation 7}$$

$$\text{Wt \% propylene} = \frac{100 * \text{mole \% } P * 42}{\text{mole \% } E * 28 + \text{mole \% } P * 42 + \text{mole \% } ENB * 120} \quad \text{Equation 8}$$

$$\text{Wt \% } ENB = \frac{100 * \text{mole \% } ENB * 120}{\text{mole \% } E * 28 + \text{mole \% } P * 42 + \text{mole \% } ENB * 120} \quad \text{Equation 9}$$

Further NMR spectral analysis of the EPDMs used in the inventive TPVs, displays a peak area from 21.3-21.8 ppm greater than 3% of the total integral area from 19.5 to 22.0 ppm. Similar spectral analysis of the EPDMs used in the comparative TPVs, show less than 3% of the total integral area between 19.5-22.0 ppm. Spectral data are referenced to the EEE backbone at 30 ppm. Peak responses in this region typically are related to differences in propylene tacticity (% mm) that have been incorporated into the EPDM. A similar analysis can be done for another type of ethylene/α-olefin/non-conjugated polyene interpolymer.

Dynamic Mechanical Spectroscopy (DMS)

Small angle oscillatory shear (melt DMS) was performed using a TA Instruments ARES, equipped with "25 mm parallel plates," under a nitrogen purge. The time between sample loading, and beginning of the test, was set to five minutes for all samples. The experiments were performed at 190° C., over a frequency range of 0.1 to 100 rad/s. The strain amplitude was adjusted, based upon the response of the samples from 1 to 3%. The stress response was analyzed in terms of amplitude and phase, from which, the storage modulus (G'), loss modulus (G''), dynamic viscosity η*, and tan delta were calculated. Specimens for Dynamic Mechanical Spectroscopy were "25 mm diameter×3.3 mm thick" compression molded discs, formed at 180° C., and 10 MPa molding pressure, for five minutes, and then quenched between chilled platents (15-20° C.) for two minutes. The rheology ratio (V0.1/V100 at 190° C.; also referred to as "RR") was recorded. A linear molecule (no detectable long chain branching) typically has a RR of 8 or less. It is acknowledged that the presence oil in the polymer can decrease the observed RR, so the following equation is used to estimate the RR of a polymer ($RR_{polymer}$) from the RR value of a polymer containing oil ($RR_{OE\_Polymer}$). $RR_{Polymer} = RR_{OE\_Polymer}/(\text{wt \% oil}*(-0.01988)+1.0321)$.

Comonomer Composition Distribution Breadth

"Comonomer Composition Distribution Breadth (CCDB)" was determined according to the following High Temperature Liquid Chromatography (HTLC) method. The HTLC was performed according to the methods disclosed in US Patent Publication No. 2010-0093964 and U.S. patent application Ser. No. 12/643,111, filed Dec. 21, 2009, both of which were herein incorporated by reference. Samples were analyzed by the methodology described below.

A Waters GPC V2000 high temperature SEC chromatograph was reconfigured to build the HT-2DLC instrumentation. Two Shimadzu, LC-20AD pumps were connected to the injector valve, in GPCV2000, through a binary mixer. The first dimension (D1) HPLC column was connected between the injector and a 10-port switch valve (Valco Inc). The second dimension (D2) SEC column was connected between the 10-port valve, and an infrared absorbance detector (IR5). The IR5 detector was used for both concentration and composition measurements. The IR5 detector was provided by PolymerChar, Valencia, Spain.

Columns: The D1 column was a high temperature Hypercarb graphite column (2.1×100 mm) purchased from Thermo Scientific. The D2 column was a PLRapid-M column purchased from Varian (10×100 mm)

Reagents: HPLC grade trichlorobenzene (TCB) can be obtained from Fisher Scientific. Decane and 2,6-Di-tert-butyl-4-methylphenol (Ionol) can be obtained from Aldrich.

Sample Preparation: "0.2 g of polyolefin sample" was placed in a 10-mL Waters autosampler vial. Next, "8-mL of decane" with "200 ppm IonoL" was added to the vial. After sparging nitrogen to the sample vial for about one minute, the sample vial was put on a heated shaker with temperature set at 160° C. The dissolution was done by shaking the vial at the temperature for two hours. The vial was then transferred to the autosampler for injection. The actual volume of the solution may be more than 8 mL, due to the thermal expansion of the solvent.

IIT-2DLC: The D1 flow rate was set at 0.01 mL/min. The composition of the mobile phase was 100% decane for the first 10 minutes of the run. The composition was then increased to 60% of TCB in 489 minutes. The data were collected for 489 minutes, as the duration of the raw chromatogram. The 10-port valve switches every three minutes, yielding 489/3=163 SEC chromatograms. A post-run gradient was used after the "489 minute" data acquisition time to clean and equilibrate the column for the next run.

Clean Step:
490 min: flow=0.01 min;//Maintained the constant flow rate of 0.01 mL/min from 0-490 min,
491 min: flow=0.20 min;//Increased the flow rate to 0.20 mL/min,
492 min: % B=100;//Increased the mobile phase composition to 100% TCB,
502 min: % B=100;//Washed the column using 2 mL of TCB.

Equilibrium Step:
503 min: % B=0;//Changed the mobile phase composition to 100% of 1-decanol or decane,
513 min: % B=0;//Equilibrated the column using 2 mL of weak eluent,
514 min: flow=0.2 mL/min;//Maintained the constant flow of 0.2 mL/min from 491-514 min,
515 min: flow=0.01 mL/min;//Lowered the flow rate to 0.01 mL/min.

After step 8, the flow rate and mobile phase composition are the same as the initial conditions of the run gradient. The D2 flow rate was at 2.51 mL/min. Two 60 µL loops were installed on the 10-port switch valve. Eluent (30-µl from D1 column was loaded onto the SEC column with every switch of the valve.

Signals from IR5 detector may be collected by EZChrom (Agilent) through a SS420X analogue-to-digital conversion box, and the chromatograms can be exported in ASCII format, and imported into a home-written MATLAB software for data reduction. One signal, referred as 'measure,' by the manufacturer, was used to determine concentrations of the eluted polymers. The other signal, referred as 'methyl,' by the manufacturer, was used to measure concentrations of methyl groups of the eluted polymers. The ratio of 'methyl' to 'measure' (methyl/measure) was used to determine the compositions of the eluted polymers after calibration. Eight polymers with different propylene contents were used in calibration. The polymers were made by metallocene catalyst giving rise to narrow comonomer composition distribution breadth or CCDB. The compositions of the eight polymer standards were determined by NMR as "0, 20.0, 28.0, 50.0, 86.6, 92.0, 95.8, and 100 weight percent" of propylene in polymer (wt % P). The calibration curve was constructed by linear fitting of the methyl/measure versus wt % P of these standards. Analysis of the raw data was calculated as follows: the first dimension HPLC chromatogram was reconstructed by plotting the IR signal of every cut (from total IR SEC chromatogram of the cut), as a function of the elution volume. The "IR vs. D1 elution volume" was normalized by total IR signal to obtain "weight fraction versus D1 elution volume" plot. The IR methyl/measure ratio was obtained from the reconstructed IR measure and IR methyl chromatograms. The ratio was converted to composition using the calibration curve of "PP wt % (by NMR) versus methyl/measure" obtained from second dimension SEC experiments.

The CCDB of a polymer sample was calculated according to the following equations:

The weight-averaged chemical composition (Wt % P) of polymer fractions eluted at the earliest elution volume ($CC_{HIGH}$):

$$CC_{HIGH} = \frac{\sum_0^{0.25} CC_i W_i}{\sum_0^{0.25} W_i}, \qquad (1)$$

where $\Sigma_0^{0.25}$ stands for the sum of the earliest 25% of polymer fractions, $CC_i$ is the chemical composition of fraction i in wt % P, and $W_i$ is the weight fraction of fraction i.

The weight-averaged chemical composition (Wt % P) of polymer fractions eluted at the latest elution volume ($CC_{LOW}$):

$$CC_{LOW} = \frac{\sum_{0.75}^{1} CC_i W_i}{\sum_{0.75}^{1} W_i}, \qquad (2)$$

where $\Sigma_{0.75}^{1}$ stands for the sum of the latest 25% of polymer fractions, $CC_i$ is the chemical composition of fraction i in wt % P, and $W_i$ is the weight fraction of fraction i.

The CCDB of a polymer sample is:

$$\text{CCD Breadth} = CC_{HIGH} - CC_{LOW} \qquad (3)$$

The unit of CCDB is Wt % P. If CCDB is calculated to be "less than 0," due to the effect of MW on HTLC elution volume, the number 0 is used.

Differential Scanning Calorimetry (DSC)

Differential Scanning Calorimetry (DSC) is used to measure crystallinity in ethylene-based (PE) samples (including EPDM) and propylene-based (PP) samples. Sample (0.5 g) sample was compression molded into a film, at 5000 psi, 190° C., for two minutes. About 5 to 8 mg of film sample is weighed and placed in a DSC pan. The lid is crimped on the pan to ensure a closed atmosphere. The sample pan is placed in a DSC cell, and then heated, at a rate of approximately 10° C./min, to a temperature of 180° C. for PE (230° C. for PP). The sample is kept at this temperature for three minutes. Then the sample is cooled at a rate of 10° C./min to −90° C. for PE (−90° C. for PP), and kept isothermally at that temperature for three minutes. The sample is next heated at a rate of 10° C./min, until complete melting (second heat). The percent crystallinity is calculated by dividing the heat of fusion ($H_f$), determined from the second heat curve, by a theoretical heat of fusion of 292 J/g for PE (165 J/g, for PP), and multiplying this quantity by 100 (for example, % cryst.=($H_f$/292 J/g)×100 (for PE)).

Unless otherwise stated, melting point(s) ($T_m$) of each polymer is determined from the second heat curve, and the crystallization temperature ($T_c$) is determined from the first cooling curve.

EXPERIMENTAL

TABLE 1

TPV Components

| Material | Description |
|---|---|
| Polypropylene | Homopolymer, DOW H110-02N, with a melt flow rate ("MFR") of 2 g/10 min at 230° C./2.16 kg |
| EPDM | EPDM A45, with 70 Mooney ML (1 + 4; 125° C.), 50% ethylene, and 4.9% ENB |
|  | EPDM B47, with 70 Mooney ML (1 + 4; 125° C.), 70% ethylene, and 4.9% ENB |
| EPDM | EPDM08* |
|  | EPDM09* |
|  | EPDM10* |
|  | EPDM02*⁺ |
| Paraffin oil | HYDROBRITE 550PO (Sonneborn) |
| Phenolic resin | SP1045 (SI group) |
| Stannous chloride (dehydrate) | (Mason Corporation) |
| ZnO | KADOX 911, (Horsehead Corporation) |

*High molecular weight polymers; oil added to production process to reduce viscosity.

Continuous Polymerization

In general terms, it is desirable to produce the inventive polymer under the conditions as explained in U.S. Pat. Nos. 5,977,251 and 6,545,088, and the references therein. The polymer products were produced in a solution polymerization process using a continuously mixed loop reactor.

Ethylene was introduced in a mixture of a solvent of ISOPAR E (a mixture of C8-C10 saturated hydrocarbons available from ExxonMobil), propylene and 5-ethylidene-2-norbornene (ENB), forming the reactor feed stream. Catalyst 1 {[[[2',2'''-[1,3-propanediylbis(oxy-kO)]bis [3-[3,6-bis (1,1-dimethylethyl)-9H-carbazol-9-yl]-5'-fluoro-5-(1,1,3,3-tetramethylbutyl)[1,1'-biphenyl]-2-olato-kO](2-)]-hafniumdimethyl} was fed to the reactor separately, and activated in-situ using co-catalyst 1 and co-catalyst 2. Cocatalyst-1 is a mixture of methyldi($C_{14-18}$ alkyl)ammonium salts of tetrakis(pentafluorophenyl)borate, prepared by reaction of a long chain trialkylamine (Armeen™ M2HT, available from Akzo-Nobel, Inc.), HCl and Li[B($C_5F_4$)$_4$], substantially as disclosed in U.S. Pat. No. 5,919,988 (Ex. 2). Cocatalyst-1 was purchased from Boulder Scientific, and used without further purification. Cocatalyst-2 (modified methylalumoxane (MMAO)) was purchased from Akzo Nobel, and used without further purification.

The outlet stream of the reactor was consequently a mixture of polymer, solvent, and reduced levels of the initial monomer streams. The molecular weight of the polymer was controlled by adjusting reactor temperature, monomer conversion and/or the addition of a chain terminating agent such as hydrogen. The polymerization reactions were performed under steady state conditions, that is, constant reactant concentration and continual input of solvent, monomers, and catalyst, and withdrawal of unreacted monomers, solvent and polymer. The reactor system was cooled and pressured to prevent formation of a vapor phase.

After polymerization, a small amount of water was introduced into the reactor exit stream as a catalyst kill, and the reactor exit stream was introduced into a flash vessel, in which the solids concentration was increased by at least 100 percent. A portion of the unreacted monomers, that is, ENB, ethylene, and propylene, and the unused diluent were then collected, and recycled back to the reactor feeds as appropriate. Also to reduce the process viscosity, extender oil such (HYDROBRITE 550) was added in the specified amount.

Tables 1A and 1B outline the reaction conditions used to produce some the inventive examples. Table 2 lists some properties of these EPDMs and some comparative EPDMs.

TABLE 1A

Reaction Conditions for EPDM

| Example | Reactor Volume, [gal] | Reactor Temp. [deg C.] | Pressure [psig] | Solvent Feed [lb/hr] | Ethylene Feed [lb/hr] | Propylene Feed [lb/hr] | ENB Feed [lb/hr] | Oil Feed [lb/hr] |
|---|---|---|---|---|---|---|---|---|
| EPDM08 | 1 | 140 | 525 | 24.87 | 1.94 | 3.50 | 0.37 | 0.573 |
| EPDM09 | 1 | 140 | 525 | 37.32 | 3.42 | 4.94 | 0.52 | 0.994 |
| EPDM10 | 1 | 140 | 525 | 37.43 | 4.80 | 4.16 | 0.58 | 1.004 |
| EPDM02 | 27 | 105 | 548 | 250.08 | 28.94 | 29.25 | 6.18 | 20.60 |

TABLE 1B

Reaction Conditions for EPDM

| Example | H2 Mol % | C2 Concen. [g/L] | Catalyst Efficiency [lb_poly/lb_metal] *10E6 | Catalyst Flow [lb/hr] | Catalyst Solution Conc. | Cocat-1 Flow [lb/hr] | Cocat-1 Solution Conc. | Cocat-2 Flow [lb/hr] | Cocat-2 Solution Conc. [wt %] | Production Rate [lb/hr] |
|---|---|---|---|---|---|---|---|---|---|---|
| EPDM08 | 0.169 | 15.27 | 0.484 | 0.07 | 37.49 | 0.06 | 306.68 | 0.08 | 69.83 | 1.63 |
| EPDM09 | 0.326 | 15.95 | 0.779 | 0.08 | 37.49 | 0.08 | 306.68 | 0.09 | 69.83 | 3.07 |
| EPDM10 | 0.735 | 22.2 | 1.734 | 0.08 | 37.49 | 0.12 | 122.57 | 0.12 | 34.67 | 3.60 |
| EPDM02 | 0.250 | 15.23 | 1.22 | 0.37 | 74.95 | 0.44 | 499.98 | 0.66 | 126.95 | 82.37 |

TABLE 2

| | VISTALON 3666 | EPDM A45 | EPDM B47 | EPDM 08 | EPDM 09 | EPDM 10 | EPDM 02 |
|---|---|---|---|---|---|---|---|
| Polymer Mooney (ML 1 + 4; 125° C.)* | 52 | | | 55 | 55 | 61 | 47 |
| Polymer Mooney (ML 1 + 4; 125° C.)*** | | 70 | 70 | | | | |
| Incorporated Oil (wt %)$^a$ | 43 | 0 | 0 | 20 | 20 | 17 | 28 |
| C2% (wt %)$^b$ | 64 | 50 | 70 | 55 | 59 | 70 | 64 |
| ENB % (wt %)$^b$ | 4.5 | 4.9 | 4.9 | 4.5 | 3.8 | 3.5 | 5.8 |
| Mw | 389,000 | 175,460 | 163,750 | 226,990 | 202,710 | 213,590 | 208,894 |
| Mw/Mn | 2.9 | 2.7 | 2.7 | 2.8 | 3.0 | 3.1 | 2.8 |
| η (0.1) | 103,540 | 89,253 | 118,700 | 84,155 | 76,530 | 121,170 | 64,286 |
| η(0.1/100)* | 57.7 | | | 34.7 | 29.2 | 37.9 | 25.3 |
| η(0.1/100)** | | | | 54.7 | 46 | 54 | 53.2 |
| η(0.1/100)*** | | 27.1 | 31.3 | | | | |
| CCBD | 7.5 | 4.4 | 2.4 | 5.0 | 5.0 | 2.5 | 2.6 |
| NMR % Peak Area 21.3-21.8 ppm | ND | ND | ND | 16 | 13 | 7 | 8 |

*Measured value with oil.
**Rheology ratio (no oil) estimated using equation, $RR_{Polymer} = RR_{OE\_Polymer}/(\text{wt \% oil}*(-0.01988)) + 1.0321)$, where RRpolymer is the rheology ratio of polymer (no oil), and $RR_{OE}$ is the rheology ratio of the polymer with oil.
***Measured value without oil.
ND = Not Detected
$^a$Incorporated oil measured by mass balance, and equal to the weight percentage of oil added to the polymerized polymer, at the end of the polymerization process. Weight percentage based on total weight of polymer and oil.
$^b$Based on weight of the interpolymer.

TPV Sample Preparation:

The formulations shown in Table 3 were used for Comparative Examples A to D and Inventive Examples 1 to 8. A two step compounding process was used to prepare these examples.

First Step: Preparing the Precrosslinked (Precompounded) Composition

The formulation components, in PHR, for the TPV preblend are listed in Table 3. The following components were blended (dry mixed): EPDM; polypropylene; clay filler; stannous chloride, and zinc oxide, to form a preblend. The preblend was added to a 26-mm twin-screw extruder with a total length-to-diameter ratio (L/D) of 60. The extruder was equipped with a 24 kW motor and a maximum screw speed of 1200 rpm. The feed system for this extrusion line consisted of two, loss-in-weight feeders. The preblend was fed into the main feed throat of the extruder using a K-Tron KCLQX3, single-screw feeder. The oil was fed continuously to barrel 5 of the extruder using separate gear pumps. The precrosslinked composition was pelletized, using an underwater pelletization unit with a one hole die. The co-rotating screws for the pre-compound step have an intensive mixing screw design to fit one oil injection and one side-arm filler addition process. The first section included kneading blocks for melting the polymer feeds. The second section consisted of multiple mixing elements, i.e., gear mixing elements, narrow kneading blocks for oil incorporation. The third section emphasized on both distributive and dispersive mixing to provide good filler dispersion. The barrel temperatures after the feeding section were heated to 200° C., and kept constant across the remaining barrels. At the exit die, the temperature was set at 220° C.

Second Step: Dynamic Vulcanization of the Precrosslinked (Precompounded) Composition.

Oil (30 PHR (based on 100 parts of EPDM) and phenolic resin (5 PHR (based on 100 parts of EPDM) were added during this second step. The second step compounding was performed on the same 26 mm co-rotating, twin screw extruder. The precrosslinked composition was fed into the main feed throat of the extruder, using a K-Tron KCLQX3 single-screw feeder. Part of the liquid process oil and phenolic resin were added through an injection port at barrel 3. Part of the oil was injected at a barrel 5. Before injection, phenolic resin was dissolved in heated process oil at 120° C., and the solution was then added to the extruder using a Leistritz Gear Pump cart, with heat traced liquid feed systems. The crosslinked (compounded) composition (TPV) exiting the extruder was then pelletized using an underwater pelletization unit. The co-rotating screws for the vulcanization step screw were designed for a sufficient residence time in the TSE process section through the use of restrictive screw elements and left-handed kneading block. The screw design was able to provide extensive kneading process to ensure sufficient heating for vulcanization process. After the introduction of the curative, distributive mixing elements are present. Further downstream, gear elements are present to promote additional dispersive mixing. The barrel temperatures after the feeding section were heated to a maximum of 220° C. and kept constant for a ⅓ of the length until cooled to 160° C. for the remaining barrels. At the exit die, the temperature was set at 220° C.

Preparation of Inventive Example 9 (TPV)

A single step compounding process was used to prepare Inventive Example 9. The formulation components "in PHR" for the TPV preblend are listed in Table 4. The following components were blended (dry mixed): EPDM; polypropylene; clay filler; stannous chloride, and zinc oxide, to form a preblend. The preblend was added to a "26-mm twin-screw" extruder with a total length-to-diameter ratio (L/D) of 60. The extruder was equipped with a 24 kW motor and a maximum screw speed of 1200 rpm. The feed system for this extrusion line consisted of two "loss-in-weight" feeders. The preblend was fed into the main feed throat of the extruder using a K-Tron KCLQX3 single-screw feeder.

Oil (50 PHR) and phenolic resin (5 PHR) were added through an injection port at barrel 3. Additional oil (40 PHR) was injected at a barrel 5. Before injection, phenolic resin was dissolved in heated process oil, at 120° C., and the solution was then added to the extruder using a Leistritz Gear Pump cart, with heat traced liquid feed systems. The crosslinked (compounded) composition (TPV) exiting the extruder was then pelletized using an underwater pelletization unit.

TABLE 3

TPV Formulations (PHR values based on 100 parts EPDM)

| Example | | A | B | C | D | 1 | 2 | 3 | 4 | 5 | 6 | 7 | 8 |
|---|---|---|---|---|---|---|---|---|---|---|---|---|---|
| EPDM | | EPDM B47 TPV-1 | EPDM B47 TPV-2 | EPDM A45 TPV-1 | EPDM A45 TPV-2 | EPDM 08 TPV-30PP | EPDM08-TPV-35PP | EPDM 08 TPV-45PP | EPEM 09 TPV-30PP | EPDM 09 TPV-45PP | EPDM 10 TPV-30PP | EPDM 10 TPV-35PP | EPDM 10 TPV-45PP |
| Total Oil | | 120 | 130 | 120 | 130 | 130 | 130 | 130 | 130 | 130 | 130 | 130 | 130 |
| PP | | 35 | 45 | 35 | 45 | 30 | 35 | 45 | 30 | 45 | 30 | 35 | 45 |
| Oil for 1st step Formulation | phr | 90 | 100 | 90 | 100 | 100 | 100 | 100 | 100 | 100 | 100 | 100 | 100 |
| EPDM B47 | phr | 100 | 100 | | | | | | | | | | |
| EPDM A45 | phr | | | 100 | 100 | | | | | | | | |
| EPDM08 (100 parts EPDM + 29.0 parts incorp. oil) | phr | | | | | 129.0 | 129.0 | 129.0 | | | | | |
| EPDM09 (100 parts EPDM + 25.4 parts incorp. oil) | phr | | | | | | | | 125.4 | 125.4 | | | |
| EPDM10 (100 parts EPDM + 21.7 parts incorp. oil) | phr | | | | | | | | | | 121.7 | 121.7 | 121.7 |
| Polypropylene | phr | 35 | 45 | 35 | 45 | 30 | 35 | 45 | 30 | 45 | 30 | 35 | 45 |
| ICECAP K filler | phr | 42 | 42 | 42 | 42 | 42 | 42 | 42 | 42 | 42 | 42 | 42 | 42 |
| PARALUX 6001 mineral oil (added during first step) | phr | 90 | 100 | 90 | 100 | 71 | 71 | 71 | 75 | 75 | 78 | 78 | 78 |
| PARALUX 6001 mineral oil (added during 2nd step) | phr | 30 | 30 | 30 | 30 | 30 | 30 | 30 | 30 | 30 | 30 | 30 | 30 |
| SP 1045 | phr | 5 | 5 | 5 | 5 | 5 | 5 | 5 | 5 | 5 | 5 | 5 | 5 |
| Stannous chloride (anhydrous) | phr | 1.26 | 1.26 | 1.26 | 1.26 | 1.26 | 1.26 | 1.26 | 1.26 | 1.26 | 1.26 | 1.26 | 1.26 |
| ZnO | phr | 2 | 2 | 2 | 2 | 2 | 2 | 2 | 2 | 2 | 2 | 2 | 2 |
| Total | | 305.3 | 325.3 | 305.3 | 325.3 | 310.3 | 315.3 | 325.3 | 310.3 | 325.3 | 310.3 | 315.3 | 325.3 |

TABLE 4

| Formulation for Ex. 9 | Wt % | PHR |
|---|---|---|
| EPDM02 (100 parts EPDM + 39 parts incorp. oil + 7 parts ICECAP K Filler used as a partitioning agent) | 43.16 | 146 |
| Polypropylene | 17.15 | 58 |
| ICECAP K filler | 10.64 | 36 |
| PARALUX 6001 mineral oil | 26.61 | 90 |
| SP 1045 | 1.48 | 5.00 |
| Stannous chloride (Anhydrous) | 0.37 | 1.26 |
| ZnO | 1.05 | 2 |

Some properties of the TPV compositions were measured and discussed below. The test methods for the mechanical properties are listed in Table 5.

TABLE 5

| Test | ASTM # | Test Condition |
|---|---|---|
| Shore A Hardness | D 2240 | 10 s delay |
| Tensile Properties | D 412 | Microtensiles--Die 84 |
| Compression Set | D 395B | 25% strain, 70 hrs @ −20° C. |
| | | 25% strain, 22 hrs @ 23° C. |
| | | 25% strain, 22 hrs @ 70° C. |
| | | 25% strain, 70 hrs @ 120° C. |

Injection Molding Method

TPV compositions were injection molded using a "Krauss Maffei KM 110-390/390 CL" Injection Molder. Each test plaques was "4 inch×6 inch×0.125 inch" in dimension. About twelve test plaques were prepared for each TPV composition.

Shore A Hardness

Hardness measurements were measured with a Shore A type durometer (ASTM D2240). The durometer was placed onto an injection molded plaque, which was injection molded according to the injection molding procedure above.

Compression Set

Compression set was measured according to ASTM D 395B, at test temperatures of −20° C., 23° C., 70° C. and 120° C. Pucks of 29 mm (±0.5 mm) were extracted from above injection molded plaques. For each sample, homogeneous four pucks (lacked notches, uneven thickness and inhomogeneity) were stacked, such that the total height was 12.5 mm (±0.5 mm), equating to compressive strain of 25%. Compression set was performed on two test specimens (four stacked pucks per specimen) for each test temperatures.

The stacked pucks were placed in the compressive device, and locked into place. The apparatus was then placed in an oven, or freezer, at the appropriate temperature, for the specified time (22 hrs for 23° C. and 70° C., 70 hrs for −20° C. and 120° C.). In this test, the stress was released at the test temperature, and the thickness of the sample was measured after a 30 minute equilibration period at room temperature.

Compression set is a measure of the degree of recovery of a sample following compression, and is calculated according to the equation CS=(H0−H2)/(H0−H1); where H0 is the original thickness of the sample, H1 is the thickness of the spacer bar used, and H2 is the final thickness of the sample after removal of the compressive force.

Stress-Strain Properties

Tensile properties were measured at room temperature following the method of ASTM D-412, on micro-tensile specimens that were die cut from the injection molded plaques. The tensile strain was calculated from the ratio of the increment of the length between clamps to the initial gauge length. The tensile stress was determined by dividing the tensile load by the initial cross section of the sample.

Oil Bleed Testing (Low Temperature Oil Retention)

Molded plaques, as discussed above, were aged for three weeks at −20° C., while resting on sheets of ZigZag cigarette paper. After aging, the cigarette paper was removed, and optically scanned against a black background, to measure the extent of oil bleed. A "Normalized Oil Bleed Index (NOBI)" was calculated according to the following equation:

NOBI=100*(% grey scale sample−% grey scale control)/(100−% grey scale control), where "% grey scale sample" refers to the percent grey scale measured on the aged sample, and "% grey scale control" refers to a reference scan on an un-aged, untreated sheet of cigarette paper.

Tape Extrusion

A Rheomix 254 single screw extruder, attached to a Haake Rheocord System 9000 torque rheometer, was to prepare extruded tapes from the competitive and inventive TPV pellets. The Rheomix 254 is a 25 L/D single screw extruder, equipped with ¾ inch screw and four temperature zones. The extrusion temperature profile was set at 150, 160, 170, and 180° C. (die), and the screw speed was set at 80 RPM. The front side of the extruder was attached with a tape/slot die. The extrudate was taken off on a conveyer belt. The finished tape films were collected on a wind-up system with the dimension of the tapes being 3.5 to 4" wide and 14 to 15 mils thick.

Extrusion Surface Quality

The surface quality of extruded tape made from the TPV compound was evaluated using a visual rating of the tape appearance and smoothness, its uniform edges and smooth surface. Additionally, the surface roughness can be measured using a profilometer. Typically surface roughness can be in the range from (0.0001 to 0.0002 mm. A "fail rating" results when raise surfaces are visually apparent on the tape surface, to give the film a coarse surface texture. A coarse surface texture is indicative of poor dispersion of the rubber phase, and may also represent an incomplete phase inversion (when thermoplastic polymer (e.g., PP) becomes the continuous phase). A "pass rating" results when the tape has a smooth, uniform surface.

Properties of the TPVs are shown in Table 6. It has been unexpectedly discovered that the inventive TPV compositions have improved surface quality, and some also have improved "low temperature oil retention," all as compared to the comparative TPV compositions, while maintaining good mechanical properties.

For example, Comparative Example A—injection molded TPV plaques made from EPDM B47, showed good surface quality, a Shore A of 66, "120° C. Compression Set" of 48%, but demonstrated a high NOBI value of 100%. Comparative Example B—injection molded TPV plaques made EPDM B47, showed good surface quality, a Shore A of 69, "120° C. Compression Set" of 66%, but also demonstrated a high NOBI value of 100%. Comparative Example C—injection molded TPV plaques made EPDM A45, showed poor surface quality, a Shore A of 57, "120° C. Compression Set" of 43%, and demonstrated a NOBI value of 3%. Comparative Example D—injection molded TPV plaques made EPDM A45, showed poor surface quality, a Shore A of 62, "120° C. Compression Set" of 44%, and demonstrated a NOBI value of 6%. The comparative examples demonstrate that it is difficult to achieve both good surface quality and low temperature oil retention with the TPV compositions formed from EPDM B47 and EPDM A45.

Inventive Examples 1,2,3—injection molded TPV plaques made from EPDM 08, showed excellent surface quality, Shore A range of 51-63, and "120° C. Compression Set" in the range of 43-48, and also demonstrated low NOBI values of less than, or equal to, 6%. Inventive Examples 4 and 5—injection molded TPV plaques made from EPDM 09, showed excellent surface quality, Shore A range of 53-64, and "120° C. Compression Set" in the range of 47-54, and demonstrated low NOBI values of less than, or equal to, 5%. Inventive Example 6,7,8—injection molded TPV plaques made from EPDM10, showed excellent surface quality, Shore A range of 54-65, and "120° C. Compression Set" in the range of 47-53. Inventive Example 9—injection molded TPV plaques made from EPDM 02, showed excellent surface quality, Shore A of 67, and "120° C. Compression Set" of 47, and demonstrated low NOBI values of 9%. The results from the inventive examples demonstrate an improved balance of surface quality and preferably low temperature oil retention characteristics, while maintaining good Compression Set.

It is believed that the molecular weight EPDMs, with a rheology ratio (no oil) greater than 35 (indicative of long chain branching), a low CCBD, and high tacticity (% NMR peak area between 21.3 and 21.8 ppm, at greater than 3%, as it relates to % mm tacticity in the EPDM), provide TPVs that have a homogeneous melts and a fast crystallization setups, and also a finer dispersion (increased uniform dispersion with smaller rubber particles) of EPDM within the TPV. As a result, the inventive examples demonstrate excellent surface quality, and some also show good low temperature oil retention.

TABLE 6

| Example | | A | B | C | D | 1 | 2 | 3 | 4 | 5 | 6 | 7 | 8 | 9 |
|---|---|---|---|---|---|---|---|---|---|---|---|---|---|---|
| Hardness (Shore A 10s) | | 66 | 69 | 57 | 62 | 51 | 56 | 63 | 53 | 64 | 54 | 59 | 65 | 57 |
| Compression Set 70 hr @ 120° C. | % | 48 | 66 | 43 | 44 | 43 | 44 | 48 | 47 | 54 | 47 | 51 | 53 | 47 |
| Compression Set 22 hr @ 70° C. | % | 31 | 43 | 26 | 29 | 24 | 25 | 28 | 28 | 33 | 26 | 31 | 32 | 31 |
| Compression Set 22 hr @ 23° C. | % | 20 | 22 | 12 | 14 | 13 | 14 | 16 | 15 | 16 | 19 | 22 | 22 | 17 |
| Compression Set 70 hr @ −20° C. | % | 21 | 24 | 10 | 11 | 10 | 13 | 13 | 12 | 15 | 33 | 35 | 29 | 11 |
| 100% Modulus | psi | 452 | 472 | 344 | 391 | 282 | 338 | 396 | 293 | 399 | 315 | 342 | 410 | 422 |
| Elongation | % | 162 | 256 | 137 | 166 | 126 | 136 | 170 | 176 | 255 | 199 | 276 | 296 | 199 |

TABLE 6-continued

| Example | | A | B | C | D | 1 | 2 | 3 | 4 | 5 | 6 | 7 | 8 | 9 |
|---|---|---|---|---|---|---|---|---|---|---|---|---|---|---|
| Tensile Strength | psi | 533 | 677 | 401 | 510 | 306 | 394 | 516 | 396 | 639 | 447 | 587 | 692 | 608 |
| Tear Strength | lbf/inch | 145 | 176 | 97 | 117 | 87 | 100 | 119 | 95 | 134 | 112 | 135 | 153 | 146 |
| NOBI | % | 100 | 100 | 3 | 6 | 6 | 3 | 2 | 4 | 5 | 100 | 100 | 98 | 9 |
| Extrusion surface quality | | pass | pass | fail | fail | pass | pass | pass | pass | pass | pass | pass | pass | pass |

The invention claimed is:

1. A composition comprising at least the following components:
   A) an EPDM that has the following properties:
      i) a rheology ratio (V0.1/V100 at 190° C.) greater than, or equal to, 35;
      ii) a weight average molecular weight (Mw) greater than, or equal to, 200,000 g/mol; and
      iii) a CCDB (Chemical Composition Distribution Breadth) less than 7;
   B) a thermoplastic polymer;
   C) a vulcanization agent; and
   wherein the interpolymer comprises incorporated oil; and wherein the interpolymer has a peak area, from 21.3 ppm to 21.8 ppm, that is greater than 3 percent of the total integral area from 19.5 ppm to 22.0 ppm, as determined by 13C NMR.

2. The composition of claim 1, wherein the EPDM has a Mooney Viscosity greater than, or equal to, 60 (ML 1+4, 125° C.).

3. The composition of claim 1, wherein the EPDM comprises from 55 to 72 weight percent ethylene, based on the weight of the interpolymer.

4. The composition of claim 1, wherein the EPDM has a MWD less than, or equal to, 3.5.

5. A composition comprising the following:
   A) a first composition comprising:
      a) a first EPDM;
      b) a second EPDM; and wherein the first composition has the following properties:
         i) an MWD less than, or equal to, 3.5,
         ii) a Mooney Viscosity (ML (1+4, 125° C.)) greater than, or equal to, 60,
         iii) a CCDB from 7 to 15;
   B) a thermoplastic polymer;
   C) a vulcanization agent; and
   wherein the first interpolymer and the second interpolymer comprise incorporated oil; and
   wherein the first composition has a rheology ratio (V0.1/V100 at 190° C.) greater than, or equal to, 35; and wherein the first composition has a peak area, from 21.3 ppm to 21.8 ppm, that is greater than 3 percent of the total integral area from 19.5 ppm to 22.0 ppm, as determined by 13C NMR.

6. The composition of claim 5, wherein the absolute difference in ethylene content between the first interpolymer and the second interpolymer is from 5 to 10 weight percent.

7. The composition of claim 5, wherein the first composition has a weight average molecular weight (Mw) greater than, or equal to, 200,000 g/mole.

8. The composition of claim 1, wherein the thermoplastic polymer of Component B is a propylene-based polymer.

9. The composition of claim 1, wherein the vulcanization agent of Component C is selected from the group consisting of phenolic resins.

10. A crosslinked composition formed from the composition of claim 1.

11. An article comprising at least one component formed from the composition of claim 1.

12. The article of claim 11, wherein the article is selected from the group consisting of profiles, injection molded parts, gaskets, shoe components and tubes.

13. The composition of claim 1, wherein the EPDM comprises from 55 to 68 weight percent ethylene, based on the weight of the interpolymer.

14. The composition of claim 1, wherein the EPDM has a peak area, from 21.3 ppm to 21.8 ppm, greater than, or equal to, 8 percent of the total integral area from 19.5 ppm to 22.0 ppm, as determined by 13C NMR.

15. The composition of claim 1, wherein the EPDM is present in an amount greater than, or equal to, 40 weight percent, based on the weight of the composition, and the thermoplastic polymer is present in an amount less than, or equal to 50 weight percent, based on the weight of the composition.

16. The composition of claim 1, wherein the EPDM has a peak area, from 21.3 ppm to 21.8 ppm, greater than, or equal to, 5 percent of the total integral area from 19.5 ppm to 22.0 ppm, as determined by 13C NMR.

17. The composition of claim 5, wherein the first composition has a peak area, from 21.3 ppm to 21.8 ppm, greater than, or equal to, 5 percent of the total integral area from 19.5 ppm to 22.0 ppm, as determined by 13C NMR.

18. The composition of claim 5, wherein the first composition has a peak area, from 21.3 ppm to 21.8 ppm, greater than, or equal to, 7 percent of the total integral area from 19.5 ppm to 22.0 ppm, as determined by 13C NMR.

* * * * *